United States Patent
Kapadia et al.

(10) Patent No.: US 7,488,023 B2
(45) Date of Patent: Feb. 10, 2009

(54) FRONT END MODULE LOWER BEAM BODY ON FRAME JOINT

(75) Inventors: Ameil A. Kapadia, Shelby, MI (US); Martin R. Matthews, Troy, MI (US); Hao Chen, Madison Heights, MI (US)

(73) Assignee: Magna International (CA)

( * ) Notice: Subject to any disclaimer, the term of this patent is extended or adjusted under 35 U.S.C. 154(b) by 0 days.

(21) Appl. No.: 11/823,582

(22) Filed: Jun. 28, 2007

(65) Prior Publication Data
US 2009/0001744 A1 Jan. 1, 2009

(51) Int. Cl.
*B62D 27/00* (2006.01)
(52) U.S. Cl. .................... 296/29; 403/232.1
(58) Field of Classification Search .................. 296/29, 296/146.6, 187.12; 280/279, 701; 248/300; 403/403, 217
See application file for complete search history.

(56) References Cited

U.S. PATENT DOCUMENTS

| | | | | |
|---|---|---|---|---|
| 666,918 | A * | 1/1901 | Butz | 248/300 |
| 4,455,805 | A * | 6/1984 | Rionda et al. | 403/232.1 |
| 4,785,599 | A * | 11/1988 | Murphy | 52/302.7 |
| 5,119,903 | A * | 6/1992 | Ulshafer, Jr. | 248/439 |
| 5,380,116 | A * | 1/1995 | Colonias | 403/232.1 |
| 5,841,068 | A * | 11/1998 | Umstead et al. | 174/58 |
| 5,934,019 | A * | 8/1999 | Rotharmel et al. | 49/28 |
| 6,446,409 | B1 * | 9/2002 | Emerson | 403/232.1 |
| 6,527,232 | B2 * | 3/2003 | Robertson et al. | 248/48.2 |
| 6,681,895 | B2 * | 1/2004 | Virtue | 182/186.3 |
| 6,810,996 | B2 * | 11/2004 | Rump | 182/186.5 |
| 7,017,876 | B1 * | 3/2006 | LeCher | 248/300 |
| D535,758 | S * | 1/2007 | Spreadborough | D25/68 |

* cited by examiner

*Primary Examiner*—Kiran B. Patel
(74) *Attorney, Agent, or Firm*—Warn Partners, P.C.; Mark Luddy

(57) ABSTRACT

A structural joint for a vehicle is provided that includes a first tubular beam with forward and rear faces extending in a non-fore and aft direction. A bracket has a first leg abutting the first beam's forward face and a second leg transverse to the forward and rearward faces. The bracket has a third leg extending generally outward from the second leg. A mound is connected with the bracket and extending outwardly from the bracket's third leg provides a presentation surface spaced away from the bracket third leg. A second tubular beam has an end with a generally inverted U-shaped rear face with a central portion that abuts the mound. The second beam rear face also has vertical end portions abutting the bracket third leg. The second tubular beam has a front face which is spaced from the bracket third leg. Threaded fasteners connect the bracket and the second tubular beam together. The above noted arrangement causes the first and second beam to be joined in a very strong joint wherein the stress is experienced by the beams along their forward and rearward faces are generally communicated with one another in a manner akin to that of a bent corner of a single hydro-formed beam.

20 Claims, 6 Drawing Sheets

US 7,488,023 B2

FRONT END MODULE LOWER BEAM BODY ON FRAME JOINT

FIELD OF THE INVENTION

The present invention relates to structural joints for automotive vehicles especially light trucks and pick-up tucks having a boxed frame chassis.

BACKGROUND OF THE INVENTION

Many pick-up truck and light truck type vehicles have a structural frame which includes parallel spaced side rails. The parallel spaced longitudinal side rails are typically tubular closed box structures. At a forward end of each side rail, the side rails incline inwardly to blend into a generally non fore and aft orientated section commonly referred to as the lower front end sheet metal. The lower front end sheet metal is typically joined by a transverse member often referred to as the lower beam to form a unitary structure. For light trucks, the rigidity of the frame is critical. Therefore, the joint between the lower front end sheet metal and the lower beam must have greater rigidity than that of a small car. Accordingly, in many applications, the joint between the lower front end sheet metal section and the lower beam is a welded joint or is a hydro formed integral crescent shaped member.

Many vehicles are formed in modules to reduce assembly complexity. It is sometimes desirable that the front grille along with the lighting hardware be assembled to the remainder of the vehicle as a module. When assembling the front grille and lighting hardware to the vehicle as a front end module, it is sometimes preferable that the front end module be previously connected with the lower front beam. Accordingly, it is desirable that the lower front beam be connectable to the lower front end sheet metal by fore and aft oriented fasteners to facilitate assembly. This is a very common practice when assembling passenger cars which do not have as great need for rigidity in the joint of the lower end sheet metal to lower front beam. However, for pick-up and light truck vehicles, the lower front beam and the lower front end sheet metals are typically fabricated from tubular material as mentioned previously. In the past, it has been very difficult to find a method wherein the attachment of the lower front beam to the front end sheet metal could be accomplished in a way wherein the stresses experienced by the unified structural member were closely akin to that experienced when the lower beam and the lower front sheet metal are one continuous welded or hydro formed member. It is desirable to provide a structural joint which allows the lower beam to be fastener connected in a fore and aft direction to the lower front end sheet metal while at the same time providing a joint with high structural rigidity.

SUMMARY OF THE INVENTION

An embodiment of the present invention provides a structural joint for an automotive vehicle that includes a first generally tubular beam extending in a non-fore and aft direction. The first beam has forward and rear faces. A bracket is provided having a first leg that generally abuts the first tubular beam's forward face. The bracket also has a second leg which is generally transverse to the forward and rear ward faces of the first tubular beam. The bracket also has a third leg which extends generally outward from the second leg. A mound is provided which is connected with the bracket and extends outwardly from the bracket's third leg. The mound provides a presentation surface spaced away from the bracket third leg. A second tubular beam is also provided. The second tubular beam has an end with a generally inverted U-shaped rear face with a central portion that abuts the mound's presentation surface. The second beam rear face also has vertical end portions abutting the bracket third leg. The second tubular beam has a front face which is generally parallel spaced from the bracket third leg. Threaded fasteners connect the bracket and the second tubular beam together. The above noted arrangement causes the first and second beam to be joined in a very strong joint wherein the stress is experienced by the beam along their forward and rearward faces are generally communicated with one another in a manner akin to that of a bent corner of a single hydro-formed beam.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
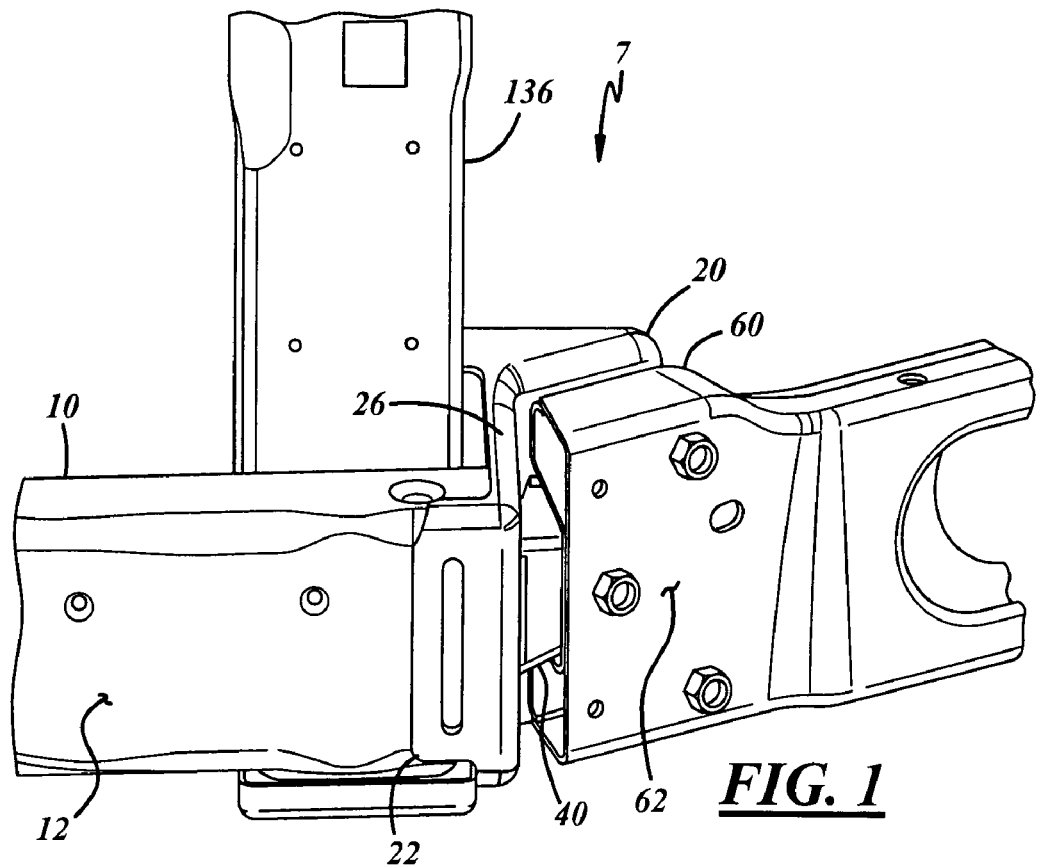
FIG. 1 is a front perspective view of an embodiment of the present invention illustrating first and second beams and a bracket being joined together by three fore and aft orientated threaded fasteners.
Figure 2:
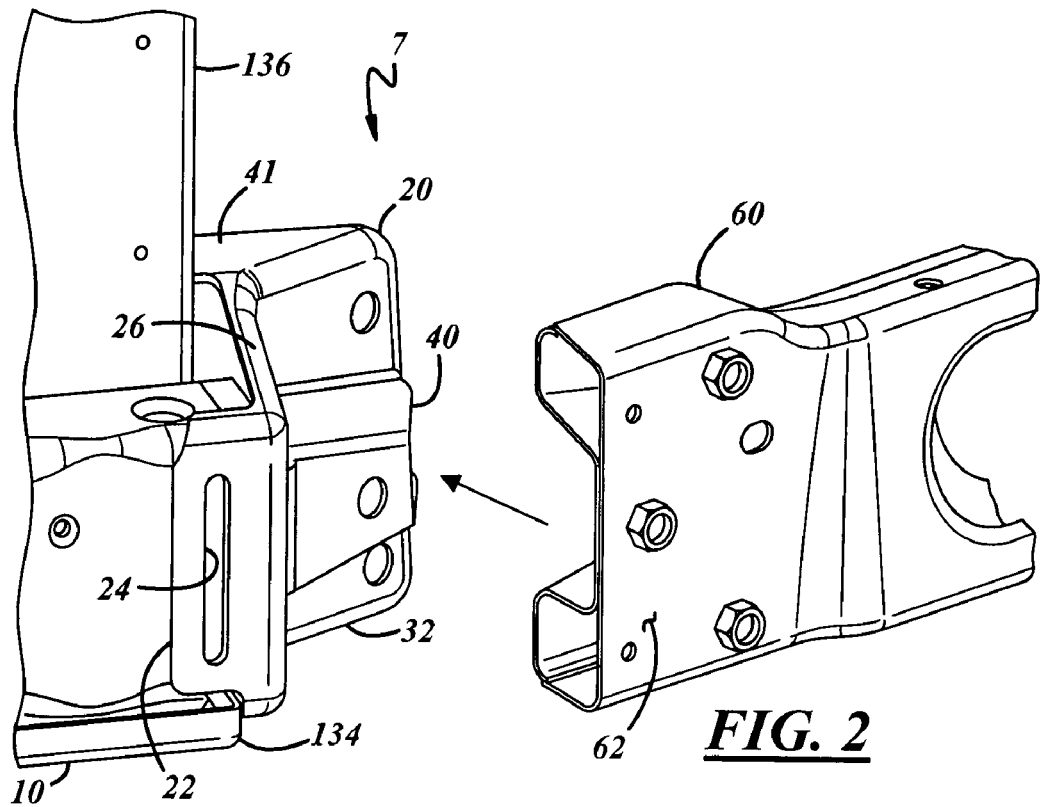
FIG. 2 is an exploded view illustrating the second beam being separated from the first beam and bracket.
Figure 3:
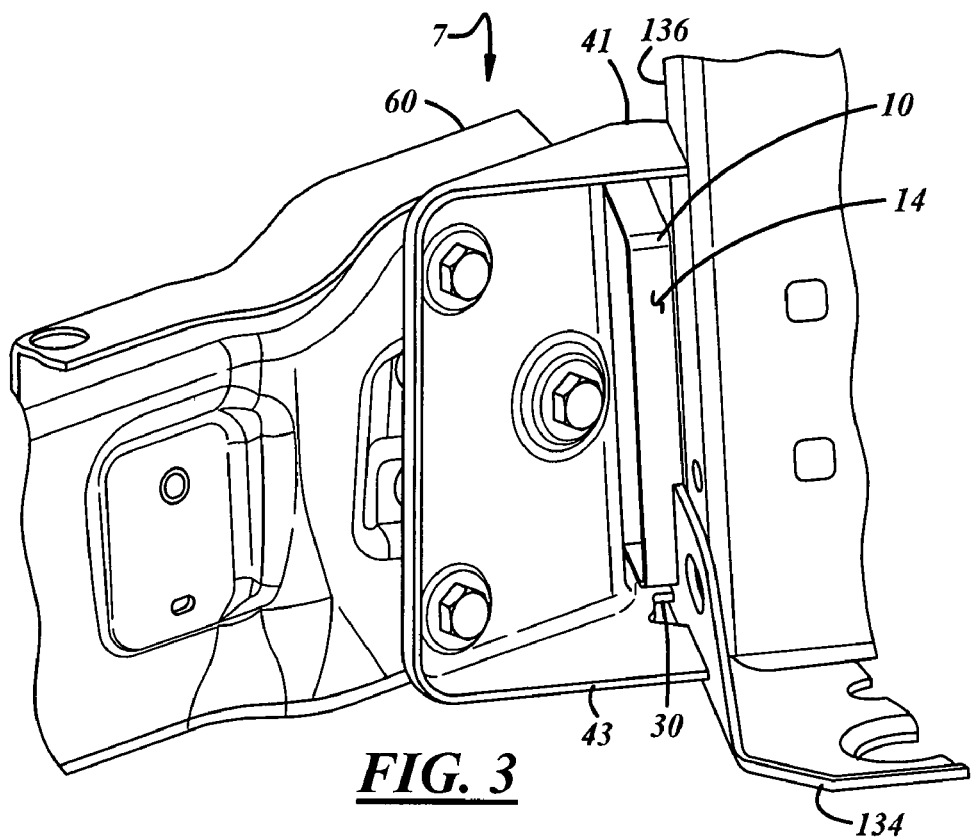
FIG. 3 is a rear perspective view of the structural joint shown in FIG. 1.
Figure 4:
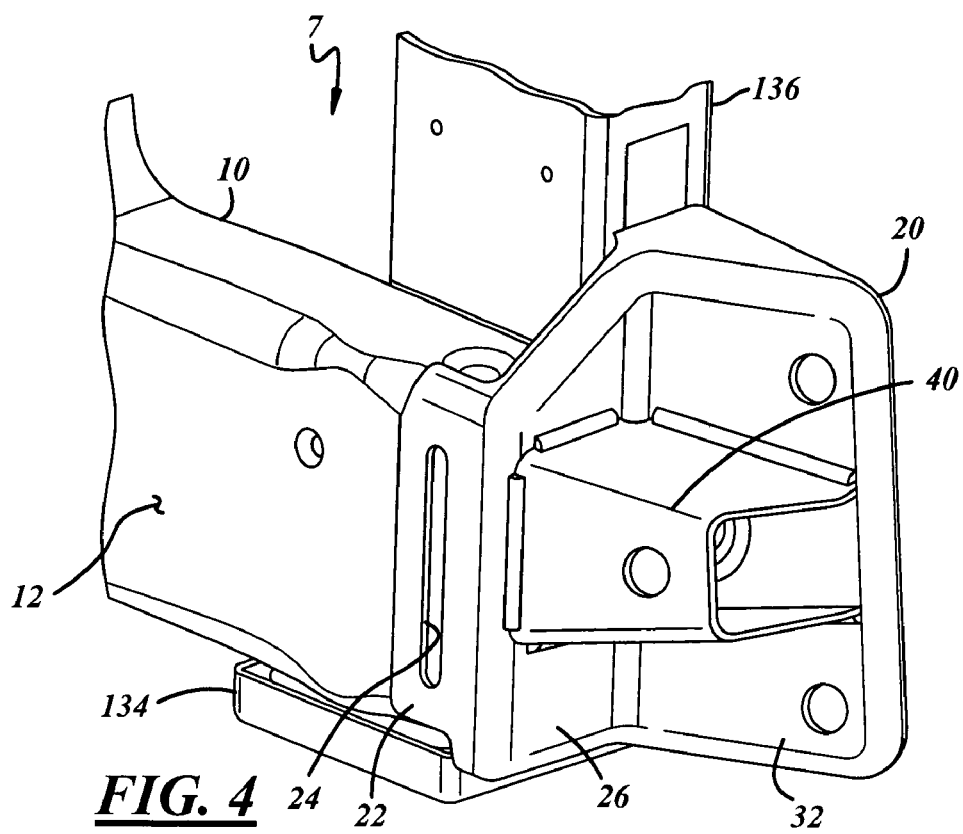
FIG. 4 is an enlarged view of the structural joint shown in FIG. 1 with the second beam being removed.
Figure 5:
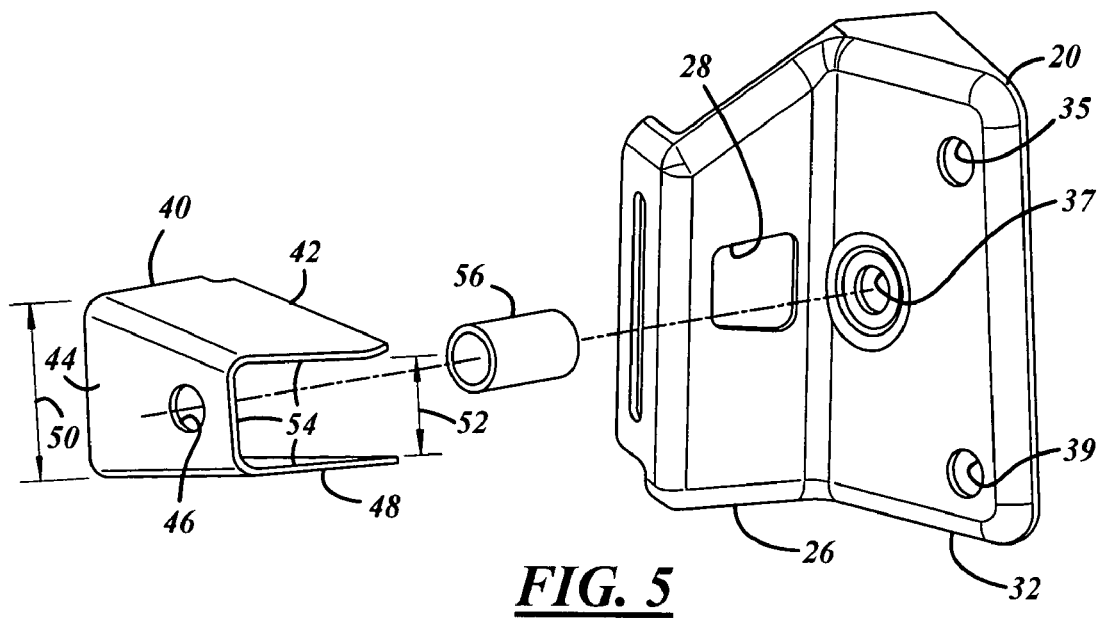
FIG. 5 is an exploded view illustrating various components of the bracket shown in FIG. 4.
Figure 6:
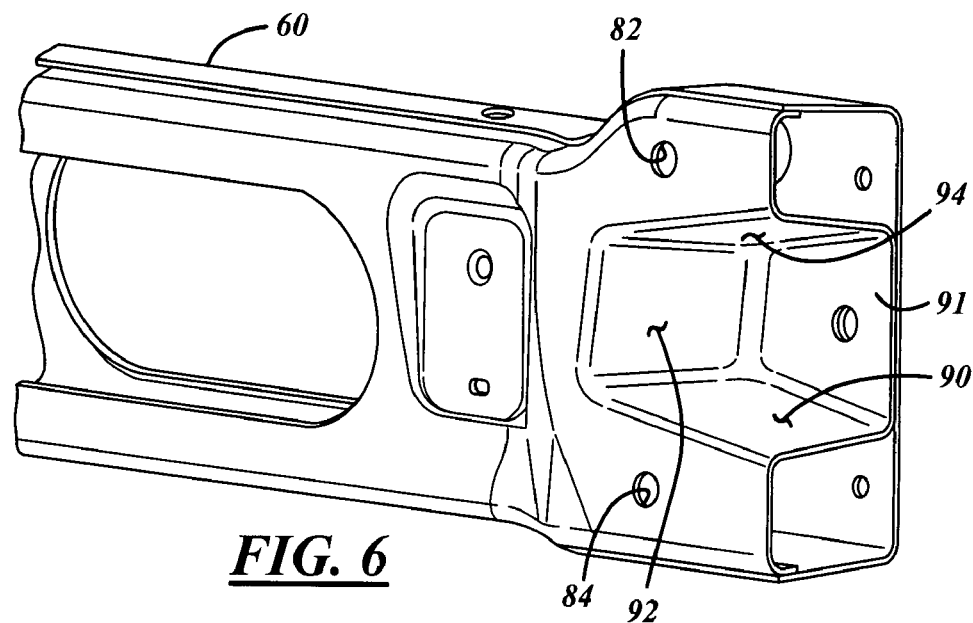
FIG. 6 is a partial rear perspective view of the second beam shown in FIG. 1.
Figure 7:
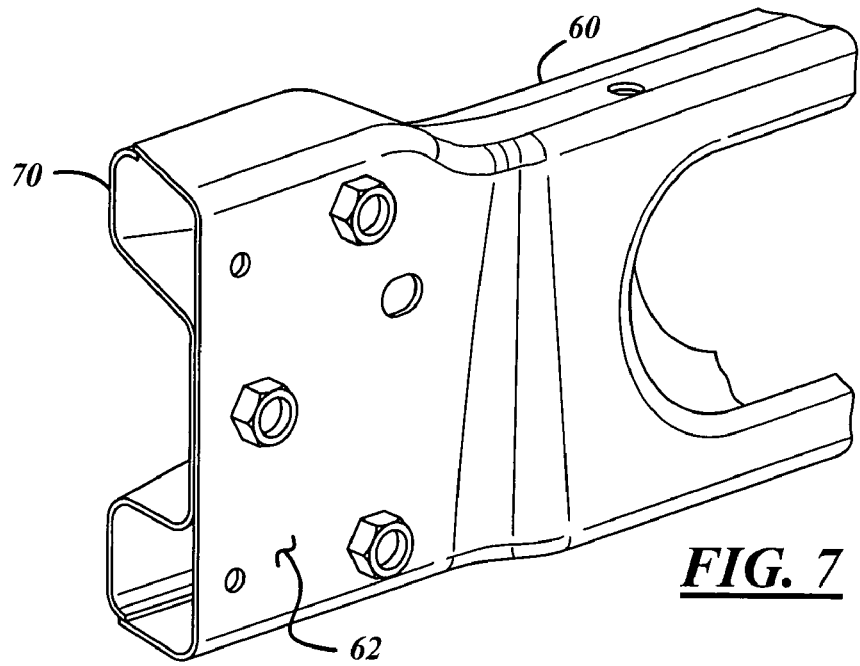
FIG. 7 is a partial front perspective view of the second beam shown in FIG. 1.
Figure 8:
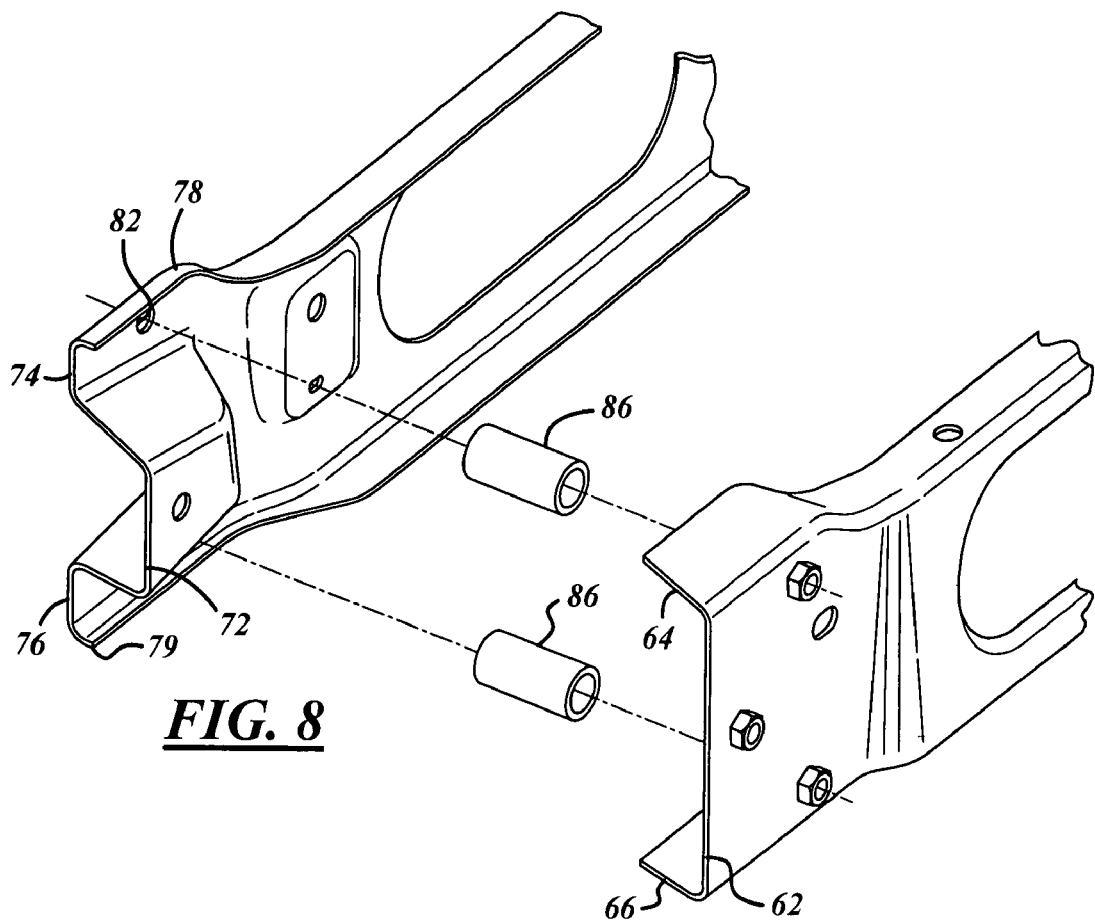
FIG. 8 is an exploded view of front and rear face stampings that are joined together to form the second beam.
Figure 10:
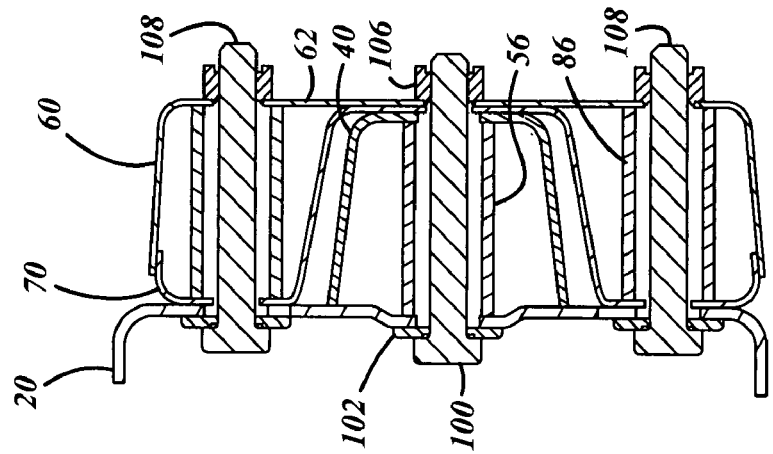
FIG. 10 is a view taken along lines 10-10 of FIG. 9.
Figure 9:
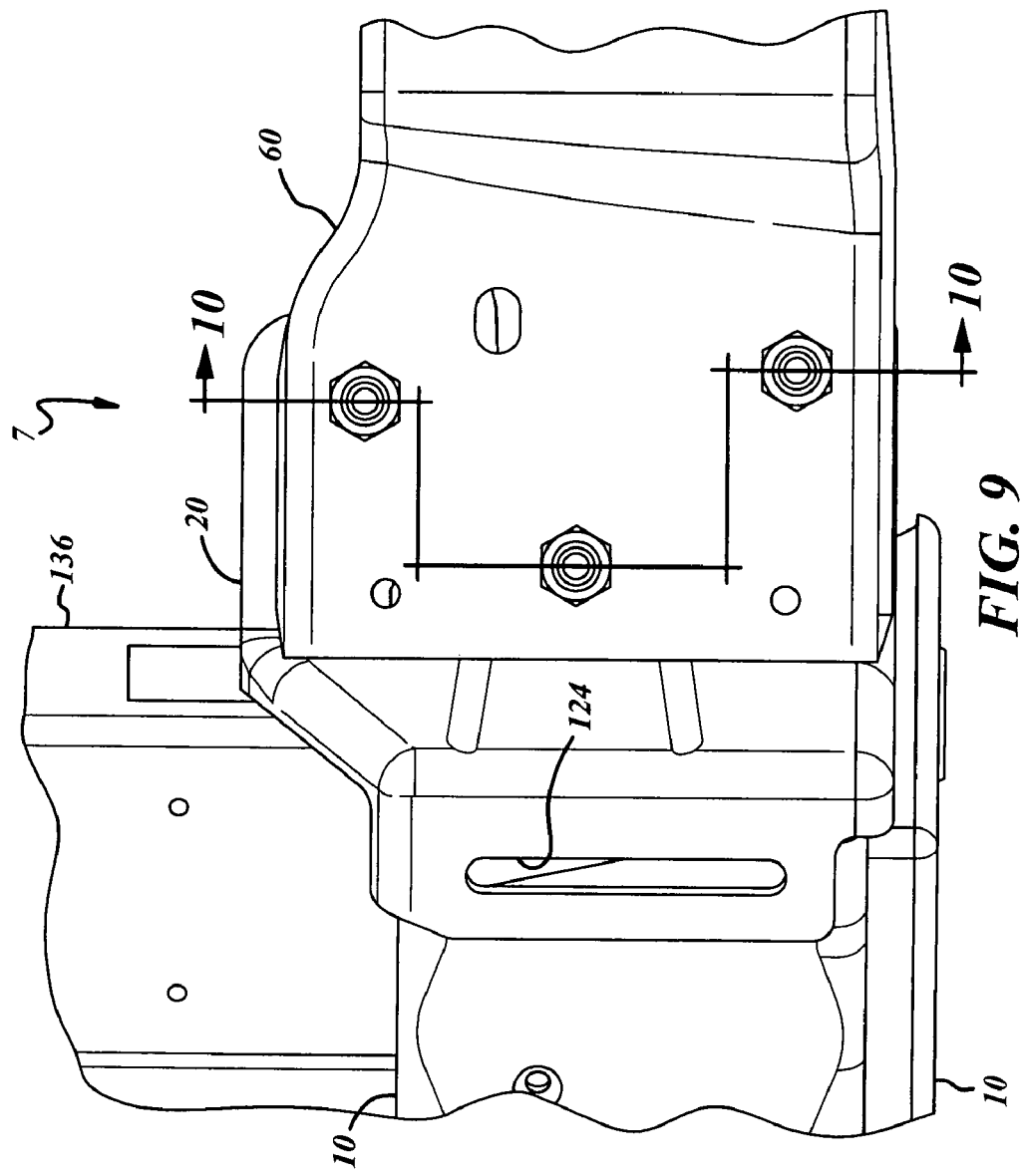
FIG. 9 is an enlarged front plan view of the structural joint shown in FIG. 1.

The following description of the preferred embodiment is merely exemplary in nature and is in no way intended to limit the invention, its application, or uses.

Referring to FIGS. 1-11, a structural joint 7 for an automotive vehicle is provided. The joint 7 has a lower front end sheet metal section or first tubular beam 10. The tubular beam 10 is typically fabricated from stamped sheet metal parts and has a forward face 12 and a rearward face 14. Typically, the first beam 10 is fabricated from a hydro formed piece or two stampings welded together. The first beam 10 is then positioned in the vehicle in a non-transverse orientation. Weldably connected with the first beam 10 is a sheet metal formed bracket 20. The bracket 20 has a first leg 22 that is generally abutting the first beam forward face 12. The first leg 22 has an elongated through slot 24 to provide a contact area for a connecting weld bead to the first beam forward face. Integrally connected to the bracket first leg 22 and projecting generally transverse to the forward and rear faces 12, 14 of the first tubular beam is a second leg 26. The bracket second leg 26 is generally trapezoidal in shape. The bracket second leg 26 has a trapezoidal shaped hole 28. The bracket second leg 26 also has a lower flange 30 (FIG. 3) extending underneath the first beam 10.

Extending outward at an obtuse angle from the bracket's second leg 26 is an integrally connected bracket third leg 32. The bracket third leg 32 is generally trapezoidal in shape and has three predrilled holes 35, 37, and 39 for fore and aft orientated fasteners. Extending outwardly from the third bracket leg 32 are upper and lower triangular horizontal bases 41 and 43.

Weldably connected to the bracket third leg 32 and extending outwardly there from is a U shaped sub bracket or mound 40. The mound 40 is formed from a stamped piece of sheet metal. The mound 40 has an upper alignment surface 42 weldably connected to the bracket third leg 32 and to the bracket second leg 26. The mound 40 has a presentation surface 44 with a fastener hole 46 generally aligned with the fastener hole 37. The presentation surface 44 is welded to the bracket second leg 26. Integrally connected with the presentation surface 44 is a lower alignment surface 48. The alignment surface 48 is weldably connected to the bracket second leg 26 and the bracket third leg 32. The presentation surface 44 at an outward end has a vertical dimension 50 that is greater than its inward vertical dimension 52. A U shaped inboard edge 54 of the surfaces 42, 44 and 48 define a fourth alignment surface whose purpose is to be described later. Captured between the presentation surface 44 and the bracket third leg 32 is a compression limiter 56.

A generally transverse orientated lower second tubular beam 60 is provided. The second tubular beam 60 is preferably fabricated from a stamping of sheet metal. A forward face 62 is formed from a first stamping. The forward face 62 is generally parallel spaced from the bracket third leg 32. The forward face 62 has extending there from two upper and lower flanges 64 and 66. Weldably connected to the second beam forward face 62 is a rear face 70. The second beam rear face 70, from the front, has an inverted U shape with a central portion 72 for abutting the presentation surface 44 of the mound. The second beam rear face 70 has upper and lower 74 and 76 vertical end portions that are abutting the bracket third leg 32. The second beam rear face has projecting forward upward and lower stud flanges 78 and 79 that are weldably overlapped by the upper and lower flanges 64 and 66 of the forward face. The second beam front and rear faces 62 and 70 have upper and lower for and aft orientated fastener holes 82, 84 that are aligned with fastener holes 35 and 39 of the bracket third leg 32. Captured between the front and rear faces 62 and 70 and aligned with the fastener holes 82 and 84 are compression limiters 86. The rear face also has alignment surfaces 90, 91, 92 and 94 to mate with the mound alignment surfaces 48, 44, 54 and 42 respectively.

Figure 11:
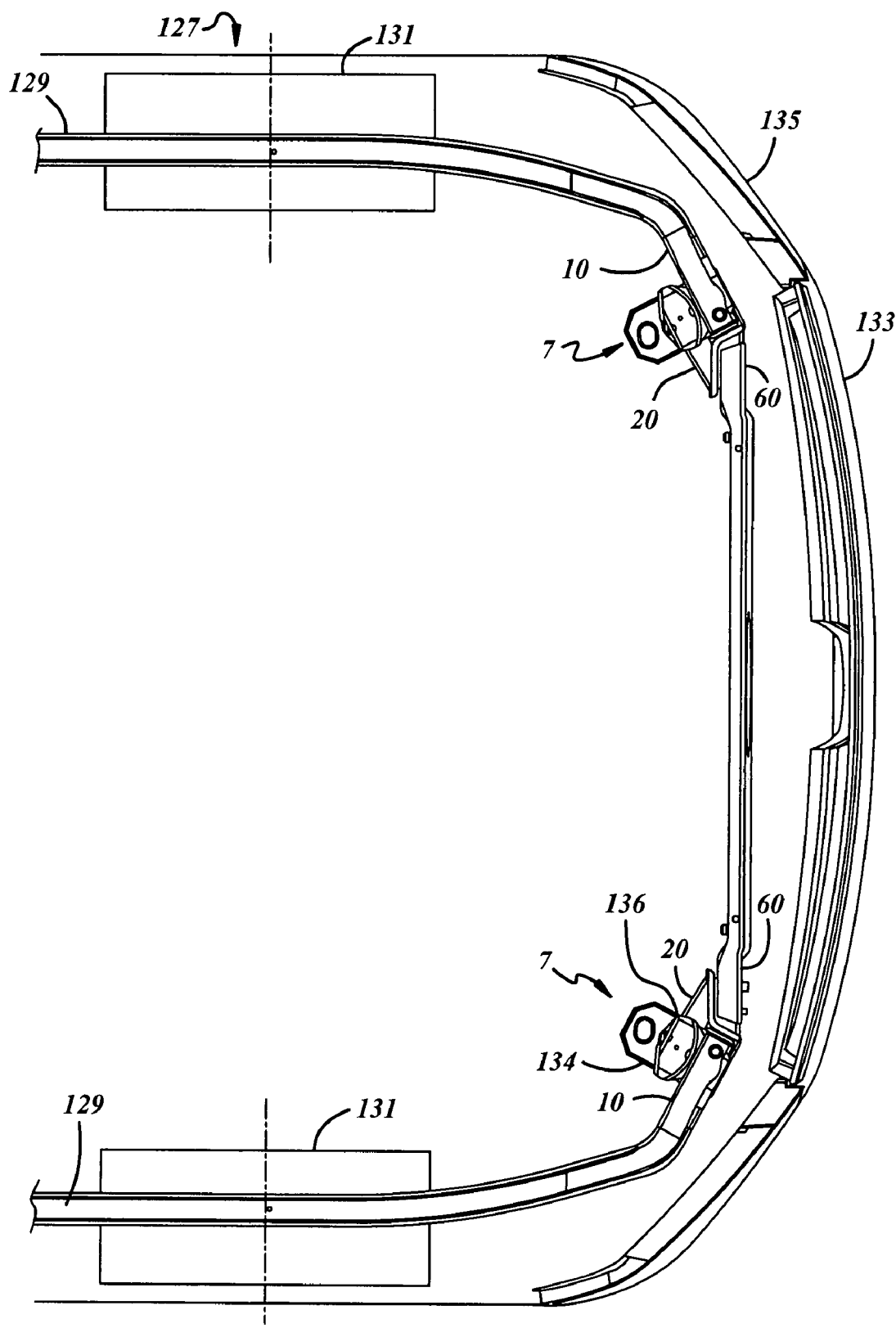
FIG. 11 is a schematic top plan view of the structural joint shown in FIG. 1 in the environment of a front end of a vehicle.

FIG. 11 is a top view of a vehicle 127 that incorporates two structural joints 7. The vehicle 127 is typically a pick-up tuck or light truck type vehicle having spaced apart boxed tubular side rails 129. The side rails 129 form a vertical crescent over the wheel well portion 131 of the vehicle and then bend inwardly to blend into the lower front end sheet metal or first beams 10.

The first front end sheet metal beams 10 are positioned on top of a body mount bracket 134. The body mount bracket 134 is connected with a vertical stanchion 136. The vertical stanchion 136 is connected with an upper transverse beam (not shown).

The first beams 10 are orientated in a non fore and aft position as mentioned previously. A grille 133 and headlamp assemblies 135 are typically part of a front end module of the vehicle 127 that is connected with the lower beam 60.

In assembling the lower beam 60 to the two first beams 10, an outboard threaded fastener 100 is penetrated through the fastener hole 37 from the rear of the bracket third leg with its head abutting a washer 102. The fastener 100 passes through the compression limiter 56 and penetrates through the fastener hole 104 provided in the second beam 60. A nut is then torqued onto the fastener 100. In like manner, fasteners 108 penetrate fastener holes 35 and 82 and 39 and 84. Since the fasteners 100 and 108 extend in a fore and aft direction, assembly can occur from the front of the vehicle which is critical in an assembly line operation. After assembly, the first beam 10, the second beam 60 and the side rails 129 are merged to form a unitary member.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A structural joint for an automotive vehicle wherein one member can be fastener assembled to a second member in a fore and aft direction comprising:
   a first generally tubular beam extending in a non fore and aft direction having forward and rearward faces;
   a bracket having a first leg generally abutting said first tubular beam forward face and a second leg generally transverse to said forward and rearward faces of said first tubular beam, and said bracket having a third leg extending generally outward from said second leg;
   a mound connected with said bracket extending outwardly from said bracket third leg having a presentation surface spaced away from said bracket third leg;
   a second tubular beam having an end with a generally inverted shape U rear face with a central portion abutting said mound presentation surface and end portions abutting said bracket third leg, and said second tubular beam having a front face generally parallel spaced from said bracket third leg; and
   a fore and aft fastener connecting said bracket and said second tubular beam together.

2. A structural joint as described in claim 1 wherein said first and second tubular beams are fabricated from stampings.

3. A structural joint as described in claim 1 wherein there are three fore and aft fasteners with one fastener passing through said mound presentation surface and two fasteners passing through portions wherein said second tubular beam end portion abutts said bracket third leg.

4. A structural joint as described in claim 3 wherein said fastener penetrating said mound is positioned outboard of said other fasteners.

5. A structural joint as described in claim 3 further including a compression limiter between said mound and said bracket.

6. A structural joint as described in claim 3 wherein there are compression limiters between said second beam front and rear face.

7. A structural joint as described in claim 1 wherein said mound is welded to said second and third legs of said bracket.

8. A structural joint as described in claim 1 wherein said mound aligns said second beam.

9. A structural joint as described in claim 8 wherein said mound defines four planar alignment surfaces with said second beam.

10. A structural joint as described in claim 1 wherein said mound vertically has a dimension outboard that is greater than a dimension inboard.

11. A structural joint as described in claim 1 wherein said mound is made from a stamping.

12. A structural joint as described in claim 1 further including a triangular horizontal base projecting from said bracket third leg.

13. A structural joint for an automotive vehicle wherein one member can be fastener assembled to a second member in a fore and aft direction comprising:
- a first sheet metal generally tubular beam extending in a non fore and aft direction having forward and rearward faces;
- a stamped bracket having a first leg generally abutting said first tubular beam forward face and a second leg generally transverse to said forward and rearward faces of said first tubular beam, and said bracket having a third leg extending generally outward from said second leg;
- a mound weldably connected with said bracket second and third legs extending outwardly from said bracket third leg having a presentation surface spaced away from said bracket third leg;
- a second sheet metal tubular beam having an end with a generally inverted shape U rear face with a central portion abutting said mound presentation surface and end portions abutting said bracket third leg, and said second tubular beam having a front face generally parallel spaced from said bracket third leg; and
- fore and aft fasteners connecting said bracket and said second tubular beam together penetrating said second mound presentation surface and said second tubular beam end portions.

14. A structural joint as described in claim 13 wherein said fastener penetrating said mound is positioned outboard of said other fasteners.

15. A structural joint as described in claim 13 further including a compression limiter between said mound and said bracket.

16. A structural joint as described in claim 13 wherein there are compression limiters between said second beam front and rear face.

17. A structural joint as described in claim 13 wherein said mound aligns said second beam.

18. A structural joint as described in claim 17 wherein said mound defines four planar alignment surfaces with said second beam.

19. A structural joint as described in claim 13 wherein said mound vertically has a dimension outboard that is greater than a dimension inboard.

20. A vehicle having a framed structural member having parallel side rails merged in to form a unitary member having with a connecting transverse member connectably by fore and aft oriented fasteners, said vehicle comprising:
- a two spaced apart generally first tubular beams, each first beam being connected with a respective side rail and extending in said non fore and aft direction and having forward and rearward faces;
- a bracket for each respective first tubular beam having a first leg generally abutting said first tubular beam forward face and a second leg generally transverse to said forward and rearward faces of said respective first tubular beam, and said bracket having a third leg extending generally outward from said second leg;
- a mound connected with each bracket extending outwardly from said bracket third leg having a presentation surface spaced away from said bracket third leg;
- a second tubular beam having ends with generally inverted shape U rear faces with central portions abutting said mound presentation surfaces and end portions abutting said brackets third leg, and said second tubular beam having a front face generally parallel spaced from said bracket third leg; and
- fore and aft fasteners connecting said brackets and said second tubular beams together.

* * * * *